US008173258B2

(12) United States Patent
Monsheimer et al.

(10) Patent No.: US 8,173,258 B2
(45) Date of Patent: *May 8, 2012

(54) POWDER WITH IMPROVED RECYCLING PROPERTIES, PROCESS FOR ITS PRODUCTION, AND USE OF THE POWDER IN A PROCESS FOR PRODUCING THREE-DIMENSIONAL OBJECTS

(75) Inventors: Sylvia Monsheimer, Haltern am See (DE); Ulrich Simon, Herne (DE); Maik Grebe, Bochum (DE); Franz-Erich Baumann, Duelmen (DE); Wolfgang Christoph, Marl (DE); Stefan Altkemper, Dorsten (DE)

(73) Assignee: Evonik Degussa GmbH, Essen (DE)

( * ) Notice: Subject to any disclaimer, the term of this patent is extended or adjusted under 35 U.S.C. 154(b) by 1859 days.

This patent is subject to a terminal disclaimer.

(21) Appl. No.: 11/241,667

(22) Filed: Oct. 3, 2005

(65) Prior Publication Data
US 2006/0071359 A1 Apr. 6, 2006

(30) Foreign Application Priority Data

Oct. 1, 2004 (DE) .................. 10 2004 047 876

(51) Int. Cl.
*C08F 6/00* (2006.01)
(52) U.S. Cl. ........ 428/403; 528/196; 528/198; 528/288; 528/480; 264/176.1; 264/219; 524/114; 524/166.6; 427/407.1
(58) Field of Classification Search ............... 264/176.1, 264/219; 524/114, 166, 6, 166.6; 528/196, 528/198, 288, 480; 427/407.1; 428/403, 428/407
See application file for complete search history.

(56) References Cited

U.S. PATENT DOCUMENTS

| | | | |
|---|---|---|---|
| 5,405,936 A | 4/1995 | Mumcu et al. | |
| 5,425,817 A | 6/1995 | Mugge et al. | |
| 5,605,944 A * | 2/1997 | Heebner ...................... 523/404 | |
| 5,668,242 A | 9/1997 | Simon et al. | |
| 5,932,687 A | 8/1999 | Baumann et al. | |
| 6,060,550 A | 5/2000 | Simon et al. | |
| 6,136,948 A | 10/2000 | Dickens, Jr. et al. | |
| 6,149,836 A | 11/2000 | Mumcu et al. | |
| 6,300,413 B1 | 10/2001 | Simon et al. | |
| 6,316,537 B1 | 11/2001 | Baumann et al. | |
| 6,335,101 B1 | 1/2002 | Haeger et al. | |
| 6,531,086 B1 | 3/2003 | Larsson | |
| 6,579,581 B2 | 6/2003 | Bartz et al. | |
| 6,589,606 B2 | 7/2003 | Waterkamp et al. | |
| 6,656,997 B2 | 12/2003 | Baumann et al. | |
| 6,677,015 B2 | 1/2004 | Himmelmann et al. | |
| 6,766,091 B2 | 7/2004 | Beuth et al. | |
| 6,784,227 B2 | 8/2004 | Simon et al. | |
| 6,884,485 B2 | 4/2005 | Baumann et al. | |
| 7,491,792 B2 * | 2/2009 | Monsheimer et al. ........ 528/480 |
| 2003/0114636 A1 | 6/2003 | Schiffer et al. | |
| 2003/0124281 A1 | 7/2003 | Ries et al. | |
| 2004/0086735 A1 | 5/2004 | Monsheimer et al. | |
| 2004/0097636 A1 | 5/2004 | Baumann et al. | |
| 2004/0102539 A1 | 5/2004 | Monsheimer et al. | |
| 2004/0106691 A1 | 6/2004 | Monsheimer et al. | |
| 2004/0137228 A1 | 7/2004 | Monsheimer et al. | |
| 2004/0138363 A1 | 7/2004 | Baumann et al. | |
| 2004/0140668 A1 | 7/2004 | Monsheimer et al. | |
| 2004/0180980 A1 | 9/2004 | Petter et al. | |
| 2004/0204531 A1 | 10/2004 | Baumann et al. | |
| 2004/0206443 A1 | 10/2004 | Monsheimer et al. | |
| 2004/0232583 A1 | 11/2004 | Monsheimer et al. | |
| 2005/0014842 A1 | 1/2005 | Baumann et al. | |
| 2005/0027047 A1 | 2/2005 | Monsheimer et al. | |
| 2005/0027050 A1 | 2/2005 | Monsheimer et al. | |
| 2005/0038201 A1 | 2/2005 | Wursche et al. | |
| 2006/0244169 A1 | 11/2006 | Monsheimer et al. | |
| 2006/0281873 A1 | 12/2006 | Alting et al. | |
| 2007/0055044 A1 | 3/2007 | Simon et al. | |
| 2007/0104971 A1 | 5/2007 | Wursche et al. | |
| 2007/0166560 A1 | 7/2007 | Wursche et al. | |
| 2007/0260014 A1 | 11/2007 | Simon et al. | |
| 2008/0119632 A1 | 5/2008 | Baumann et al. | |
| 2008/0166529 A1 | 7/2008 | Hager et al. | |
| 2008/0213552 A1 | 9/2008 | Hager et al. | |
| 2008/0217821 A1 | 9/2008 | Goring et al. | |
| 2008/0242782 A1 | 10/2008 | Hager et al. | |
| 2008/0249237 A1 | 10/2008 | Hager et al. | |
| 2009/0088508 A1 | 4/2009 | Monsheimer et al. | |

FOREIGN PATENT DOCUMENTS

DE 2906647 4/1980
(Continued)

OTHER PUBLICATIONS

Uwe Hartkopf, et al., "Zur Statistik des Einbaus einer als Regler in Polyamid 12 verwendeten aliphatischen Dicarbonsaeure", Die Angewandte Makromolekulare, Chemie, XP-002364880, vol. 169, 1989, pp. 193-209, (with English Summary).

(Continued)

*Primary Examiner* — Leszek Kiliman
(74) *Attorney, Agent, or Firm* — Oblon, Spivak, McClelland, Maier & Neustadt, L.L.P.

(57) ABSTRACT

A powder which is capable of being used in a layer-by-layer process in which regions of the respective pulverulent layer are selectively melted and, after cooling, are fixed, contains a mixture of diacid-regulated polyamide and diamine-regulated polyamide and/or diacid-regulated copolyamide and diamine-regulated copolyamide.

57 Claims, No Drawings

FOREIGN PATENT DOCUMENTS

| | | | |
|---|---|---|---|
| DE | 4317189 | A1 | 11/1994 |
| DE | 4421454 | A1 | 12/1995 |
| DE | 19708946 | A1 | 9/1998 |
| DE | 103 30 590 | A1 | 4/2004 |
| DE | 10330591 | A1 | 6/2004 |
| EP | 0 571 899 | A1 | 12/1993 |
| EP | 0911142 | A1 | 4/1999 |
| EP | 1015215 | | 7/2000 |
| WO | WO 96/06881 | | 3/1996 |
| WO | WO96/06881 | * | 3/1996 |
| WO | WO 98/51464 | | 11/1998 |
| WO | WO 01/38061 | A1 | 5/2001 |

OTHER PUBLICATIONS

U.S. Appl. No. 12/131,425, filed Jun. 2, 2008, Monsheimer, et al.
U.S. Appl. No. 12/089,926, filed Jun. 4, 2008, Haeger, et al.
U.S. Appl. No. 11/816,556, filed Jan. 28, 2008, Wursche, et al.
U.S. Appl. No. 12/192,208, filed Aug. 15, 2008, Goering, et al.
U.S. Appl. No. 10/590,935, filed Aug. 28, 2006, Monsheimer, et al.
U.S. Appl. No. 10/592,952, filed Sep. 15, 2006, Monsheimer, et al.
U.S. Appl. No. 11/561,021, filed Nov. 17, 2006, Simon, et al.
U.S. Appl. No. 11/694,129, filed Mar. 30, 2007, Monsheimer, et al.
U.S. Appl. No. 11/671,820, filed Feb. 6, 2007, Monsheimer, et al.
U.S. Appl. No. 11/587,795, filed Oct. 27, 2006, Monsheimer, et al.
U.S. Appl. No. 11/587,758, filed Oct. 27, 2006, Baumann, et al.
U.S. Appl. No. 11/596,365, filed Nov. 14, 2006, Monsheimer, et al.
esp@cenet—Abstract for EP1015214, Jul. 31, 2002.
Material Data Sheet, "Fine polyamide PA 220 for EOSINT P", Mar. 2001, pp. 1-2.
J. G. Dolden, "Structure-property relationships in amorphous polyamides," Polymer, 1976, vol. 17., October, pp. 875-892.
U.S. Appl. No. 11/484,593, filed Jul. 12, 2006, Monsheimer, et al.
U.S. Appl. No. 11/480,459, filed Jul. 5, 2006, Dowe, et al.
U.S. Appl. No. 60/831,222, filed Jul. 17, 2006, Hager, et al.
U.S. Appl. No. 12/407,065, filed Mar. 19, 2009, Monsheimer, et al.
U.S. Appl. No. 12/105,672, filed Apr. 18, 2008, Simon, et al.
U.S. Appl. No. 11/293,360, filed Dec. 5, 2005, Monsheimer, et al.
U.S. Appl. No. 11/356,416, filed Feb. 17, 2006, Monsheimer, et al.
U.S. Appl. No. 11/335,587, filed Jan. 20, 2006, Monsheimer, et al.
U.S. Appl. No. 10/565,779, filed Jan. 25, 2006, Monsheimer, et al.
U.S. Appl. No. 11/354,114, filed Feb. 15, 2006, Dowe, et al.
U.S. Appl. No. 11/354,100, filed Feb. 15, 2006, Dowe, et al.
U.S. Appl. No. 12/989,899, filed Oct. 27, 2010, Wurshche, et al.

* cited by examiner

POWDER WITH IMPROVED RECYCLING PROPERTIES, PROCESS FOR ITS PRODUCTION, AND USE OF THE POWDER IN A PROCESS FOR PRODUCING THREE-DIMENSIONAL OBJECTS

BACKGROUND OF THE INVENTION

1. Field of the Invention

The present invention relates to a powder based on difunctionally regulated polyamide or copolyamide, to a process for the use of this powder, and also to moldings of this powder.

2. Discussion of the Background

A task often encountered in very recent times is rapid provision of prototypes. Particularly suitable processes are those whose operation is based on pulverulent thermoplastic materials, in which the desired structures are produced layer-by-layer via selective melting and fixing. No support structures are needed here for overhanging and undercut sections, because the powder bed surrounding the melted regions provides sufficient support. There is no need for the subsequent step of removing supports. The processes are also suitable for small production runs.

Laser sintering is a process particularly well suited for rapid prototyping or rapid manufacturing. In this process, polymer powders in a chamber are selectively, briefly irradiated with a laser beam, resulting in melting of the particles of powder on which the laser beam falls. The molten particles fuse and solidify again after cooling to give a solid mass. Complex three-dimensional bodies can be produced simply and relatively rapidly by this process, by repeatedly applying fresh layers and irradiating these.

However, alongside laser sintering there are many other suitable processes. The selectivity of the layer-by-layer processes here can be achieved by way of application of susceptors, of absorbers, of inhibitors, or of masks, or by way of focused introduction of energy, for example via a laser beam or via a glass fiber cable.

A process of laser sintering (rapid prototyping) to realize moldings made from pulverulent polymers is described in detail in the patent specifications U.S. Pat. No. 6,136,948 and WO 96/06881 (both DTM Corporation). A wide variety of polymers and copolymers is claimed for this application, e.g. polyacetate, polypropylene, polyethylene, ionomers, and nylon-11.

The laser sintering process produces a body in the shape of a block which is composed firstly of the desired components and secondly, usually predominantly, of non-irradiated powder, known as recycling powder, which remains with the components in this block until the molding is revealed, or its covering is removed. This powder supports the components, and overhangs and undercuts can therefore be produced by the laser sintering process without supports. Depending on the nature of the powder used, the non-irradiated powder can be used in a further construction process (recycling) after sieving and addition of virgin powder.

Nylon-12 powder has proven particularly successful in industry for laser sintering to produce engineering components. The parts manufactured from PA 12 powder meet the high requirements demanded with regard to mechanical loading, and therefore have properties particularly close to those of the mass-production parts subsequently produced by extrusion or injection molding.

It is preferable here to use a nylon-12 powder whose melting point is from 185 to 189° C., whose enthalpy of fusion is 112±17 kJ/mol, and whose freezing point is from 138 to 143° C., as described in EP 0 911 142. Use is preferably made here of powders whose median grain size is from 50 to 150 μm, these being obtained as in DE 197 08 946 or else as in DE 44 21 454.

Other processes with good suitability are the SIB process as described in WO 01/38061, or a process as described in EP 1 015 214. Both processes operate with infrared heating to melt the powder. The selectivity of melting is achieved in the first process via application of an inhibitor, and in the second process via a mask. Another process is described in DE 103 11 438. In this, the energy needed for melting is introduced via a microwave generator, and the selectivity is achieved via application of a susceptor. Other suitable processes are those which operate with an absorber, which is either present in the powder or is applied by ink-jet processes, as described in DE 102004012682.8, DE 102004012683.6, and DE 102004020452.7.

A disadvantage of the related art is that the non-irradiated parts of used polyamide powder had a tendency toward post-condensation under the conditions prevailing in the construction chamber of the laser sintering machine (high temperatures, very low moisture level).

As some studies have revealed, the reclaimed polyamide powders and copolyamide powders have markedly increased solution viscosity according to ISO 307, and have only limited capability for use in the next construction process.

In order to achieve consistently good results during processing in a rapid prototyping or rapid manufacturing plant, the related art always mixes the reclaimed powder with considerable amounts of virgin powder. The amounts required of virgin powder are considerably higher than the amounts consumed for the components. The result is an excess of recycling powder which cannot be reused and has to be discarded. Specifically in the case of filigree components, considerable amounts of recycling powder arise in this way, and cannot then be used in further construction processes.

In DE 103 20 590.4, a powder with improved recyclability is described, based on the use of a mono- or dicarboxylic-acid-regulated polyamide. A disadvantage of this related art is impairment of the tensile strain at break of the parts produced therewith. Even in the case of virgin powder, this falls to a value below 10%. This restricts use as a functional prototype or indeed use in rapid manufacturing.

DE 103 305 91.2 achieves an improvement in recyclability via addition of certain additives, such as metal soaps. A disadvantage here is that components thus produced release their additives to some extent in contact with solvents, their use being subject to restriction in certain applications, specifically in contact with food or with the skin.

A uniformly diamine-regulated powder also leads to unsatisfactory results. Although here the solution viscosity remains approximately stable on heating, formation of insoluble or gelled fractions is repeatedly observed on heat-aging, as a consequence of unknown side reactions.

SUMMARY OF THE INVENTION

It is therefore an object of the present invention to provide a powder intended for use in a layer-by-layer process in which regions of the respective layer are selectively melted, the powder being suitable, via addition of small amounts of virgin powder, or even entirely without addition of virgin powder, for reuse directly as a construction material, thus reducing the resultant amount of recycling powder which has to be discarded. The intention is no impairment of mechanical properties in comparison with the related art, and no possibility of release of additives in contact with solvents.

This and other objects have been achieved by the present invention the first embodiment of which includes a powder, comprising:

a mixture of diacid-regulated polyamide and diamine-regulated polyamide and/or diacid-regulated copolyamide and diamine-regulated copolyamide;

said powder being capable of being used in a layer-by-layer process in which regions of the respective pulverulent layer are selectively melted and, after cooling, are fixed.

In another embodiment, the present invention provides a layer-by-layer process, comprising:

selectively melting regions of at least one pulverulent layer comprising a powder comprising a mixture of diacid-regulated polyamide and diamine-regulated polyamide and/or diacid-regulated copolyamide and diamine-regulated copolyamide, and, after cooling, fixing of said at least one layer.

In yet another embodiment, the present invention relates to a molding produced by the above process.

The present invention also relates to a molding, comprising:

a powder comprising a mixture of diacid-regulated polyamide and diamine-regulated polyamide and/or diacid-regulated copolyamide and diamine-regulated copolyamide;

said powder being capable of being used in a layer-by-layer process in which regions of the respective pulverulent layer are selectively melted and, after cooling, are fixed.

The present invention provides a process for the preparation of powder as claimed in claim 1, comprising:

mixing (i) a diacid-regulated polyamide powder or a diacid-regulated copolyamide powder, obtained via treatment of an unregulated polyamide or copolyamide with a dicarboxylic acid as regulator, and (ii) a diamine-regulated polyamide powder or diamine-regulated copolyamide powder, obtained via treatment of an unregulated polyamide or copolyamide with a diamine as regulator.

DETAILED DESCRIPTION OF THE INVENTION

Surprisingly, it has now been found according to the claims that mixing of oppositely difunctionally regulated polyamides or copolyamides can produce powders with almost constant solution viscosity, and that powder which comprises a mixture of these oppositely difunctionally regulated polyamides can be used repeatedly in the rapid prototyping or rapid manufacturing process without adding virgin powder or adding only a very small amount of virgin powder. In the powder mixture of the present invention, the formation of insoluble or gelled fractions does not now have a disruptive effect because the complete melting of component I (see below) provides fully satisfactory construction performance.

The present invention therefore provides a polyamide powder or copolyamide powder for use in a layer-by-layer process in which regions of the respective layer are selectively melted, which comprises a mixture of oppositely difunctionally regulated polyamide powders or of oppositely difunctionally regulated copolyamide powders.

The present invention also provides a process for the production of moldings in a layer-by-layer process in which regions of the respective layer are selectively melted, which uses a polymer powder which comprises a mixture of oppositely difunctionally regulated polyamide or copolyamide.

The present invention also provides moldings produced via a layer-by-layer process in which regions of the respective layer are selectively melted, which comprise a mixture of oppositely difunctionally regulated polyamide or copolyamide.

An advantage of the powder of the invention is that it can be reused directly in the form of recycling powder, mixed with only small amounts of virgin powder, or even without mixing, for use in a layer-by-layer process in which regions of the respective layer are selectively melted. These excellent recycling qualities often render it unnecessary to discard recycling powders.

A reason, inter alia, for the excellent recycling qualities is that no significant increase in solution viscosity of the unsintered powder takes place on exposure to thermal stress. This is probably associated with the fact that the regulated polyamide or copolyamide present in the powder of the present invention has less tendency than unregulated polyamides toward post-condensation. This applies within the variously regulated grains. In principle, the phenomenon of post-condensation is relevant to any of the polymers produced by condensation, i.e. polyesters, polyamides, etc. PA is particularly reactive in this respect: it has been found that if the number of carboxy end groups and the number of amino end groups are approximately the same, post-condensation can occur, thus increasing the solution viscosity of the polyamide in the construction process. End-group titration of the used powder, furthermore, shows that in many cases the loss of amino groups due to uncontrolled side reactions is more than stoichiometric in relation to carboxy groups, and this is regarded as indicating the presence of thermooxidative crosslinking reactions, which further impair the flowability of the used powder. The regulation substantially prevents post-condensation within an individual polymer grain. Likewise, no post-condensation can occur across the grain boundaries in the unmelted region. The solution viscosity of the powder therefore remains approximately stable even after the heat stress occurring in a rapid prototyping or rapid manufacturing process, and the powder can be reused in a further pass without losses of mechanical properties or of surface quality on the parts produced therefrom. In the melted regions, in contrast, lengthening of the polymer chains can take place when diacids and diamines are used as regulator, because the opposite-functional end groups of the oppositely difunctionally regulated polyamides or copolyamides then encounter one another at a sufficiently high temperature within the melt. This leads to good strength across the layer boundaries, and to very good component properties in respect of modulus of elasticity and tensile strain at break, and also density.

Conventional virgin powders used for laser sintering have a solution viscosity of about $\eta_{rel}$=1.6 according to ISO 307. As a result of the thermal and thermooxidative stress (post-condensation+crosslinking) during laser sintering over a construction period of two or more hours—in extreme cases some days—the non-irradiated powder (recycling powder) exhibits poorer flow properties in many instances, and if this recycling powder is directly used in laser sintering the result is an increased number of defects and undesired pores in the moldings produced. The moldings have rough and indented surface (orange-peel effect), and have markedly poorer mechanical properties in terms of tensile strain at break, tensile strength, and modulus of elasticity, and also reduced density.

In order to obtain satisfactory components complying with specification and with consistent quality, the recycling powder of the related art has to be mixed with considerable amounts of virgin powder. The amounts of the recycling powder usually used in the next construction process are from 20 to 70% by weight based on the total weight of the powder.

The amount of recycling powder includes all values and subvalues therebetween, especially including 25, 30, 35, 40, 45, 50, 55, 60, and 65% by weight based on the total weight of the powder. If the recycling powder also comprises fillers, e.g. glass beads, it is usually not possible to use more than 50% of the recycling powder. To be certain of eliminating the above-mentioned orange-peel effect, the company EOS, for example, recommends in its product information (materials data sheet "Fine polyamide PA 2200 for EOSINT P", March 2001) a ratio of 1:1, and not more than 2:1, of recycling powder to virgin powder.

The powder of the present invention is markedly less sensitive to the thermal stress in any of the processes described at the outset, and can therefore be reused as recycling powder, either directly or else with markedly smaller admixtures of virgin powder, in a layer-by-layer process in which regions of the respective layer are selectively melted. This also applies if the powder comprises fillers or other additives such as flame retardants. In all of these instances, the powder of the present invention has markedly improved recycling properties. One particular advantage is that complete recycling of the powder is possible.

Another reason permitting the very effective reuse of the heat-aged powder of the present invention is that, surprisingly, when the powder of the present invention is heat-aged no fall-off in recrystallization temperature is observed, and indeed in many instances a rise in the recrystallization temperature is observed. The result is that when aged powder of the present invention is used to form a structure, the crystallization performance achieved is almost the same as that achieved using virgin powder. The aged powder conventionally used hitherto crystallizes only when the temperatures reached are markedly lower than those for virgin powder, and depressions therefore occur when the recycled powder is used for construction structures.

Another advantage of the powder of the present invention is that it can be mixed in any desired amounts (from 0 to 100 parts) with a conventional powder based on unregulated polyamide, often used for selective laser sintering. The amount of the powder of the present invention in a mixture with conventional powder includes all values and subvalues therebetween, especially including 5, 10, 15, 20, 25, 30, 35, 40, 45, 50, 55, 60, 65, 70, 75, 80, 85, 90 and 95 parts by weight based on the total weight of the powder. When compared with powder based on unregulated polyamide, the resultant powder mixture gives a smaller rise in solution viscosity, and therefore also gives improved recyclability.

The powder of the present invention is described below, as is a process which uses this powder, but there is no intention that the present invention be restricted thereto.

The powder of the present invention for use in a layer-by-layer process in which regions of the respective layer are selectively melted comprises a mixture of oppositely difunctionally regulated polyamides or copolyamides. The phrase "a mixture of oppositely difunctionally regulated polyamide or copolyamide" refers to a mixture of diacid-regulated and of diamine-regulated polyamide or copolyamide. It can be advantageous for the ratio of the amino end groups to the carboxy end groups in the mixture of the present invention to be as close to 1:1 as possible.

Chemical analysis of a conventional powder exposed to thermal stress for example in the laser sintering process reveals a marked increase in solution viscosity, resulting from molecular weight increase, and also a reduction in the number of amino end groups which is more than stoichiometric in relation to the reacted carboxy end groups. This is explained firstly in that free amino end groups and carboxy end groups in the polyamide powder or copolyamide powder can react with one another with elimination of water under the conditions in an RM/RP machine (Rapid Manufacturing/Rapid Prototyping machine), this reaction being known as post-condensation. Secondly, the reduction in the number of amino functions derives from the thermooxidative elimination of these groups, with subsequent crosslinking.

The effect of the dicarboxylic acid regulator during the polymerization of the first component of the mixture is that the number of free amino end groups is reduced. In the first polyamide or copolyamide component I to be used according to the present invention, therefore, an excess of carboxy end groups is present.

In contrast, a diamine is used as regulator during the polymerization of the second component of the mixture, and leads to a reduction in the number of free acid groups. In the second polyamide component II or copolyamide component II to be used according to the present invention, therefore, an excess of amino end groups is present.

The dry blend method is used to mix the two pulverulent components, for example in a high-speed mixer.

The quantitative proportions are preferably adjusted so that the total number of acid end groups is approximately the same as the total number of amino end groups across components I and II. The ratio of acid end groups to amino end groups, or amino end groups to acid end groups, in the powder mixture of the present invention is less than 5:1, preferably less than 3:1, and particularly preferably 1.5:1, and very particularly preferably 1:1. The difference between the solution viscosities of components I and II is if possible not more than 0.4, preferably not more than 0.2, and very particularly preferably not more than 0.1. Another sector of preference consists in an intentional solution viscosity difference of from about 0.3 to 0.4 between one component and the other, in order that the component with better flow can act like a matrix to surround the component with poorer flow, thus minimizing the number of cavities in the components produced.

Solution viscosity is determined in m-cresol solution at 0.5% strength to DIN 307.

The excess of carboxy end groups in the polyamide or copolyamide of the first pulverulent component, or the excess of amino end groups in the polyamide or copolyamide of the second pulverulent component of the powder, has permitted a marked reduction, or complete elimination, of the increase in solution viscosity, and of the thermal oxidative loss of end groups from polyamides or copolyamides in the powder of the present invention.

The first pulverulent component of the present invention preferably comprises a polyamide or copolyamide which preferably comprises from 0.01 part to 5 parts by weight based on the weight of the first pulverulent component, with preference from 0.1 to 2 parts, of a dicarboxylic acid as regulator. The amount of the dicarboxylic acid includes all values and subvalues therebetween, especially including 0.05, 0.1, 0.5, 1, 1.5, 2, 2.5, 3, 3.5, 4 and 4.5 parts by weight.

The first pulverulent component of the present invention particularly preferably comprises a polyamide or copolyamide in which the ratio of carboxy end group to amino end group is 2:1 or higher. The content of amino end groups in this polyamide or copolyamide may be below 40 mmol/kg, preferably below 20 mmol/kg, and very preferably below 10 mmol/kg. The solution viscosity of the polyamide or copolyamide is preferably from 1.4 to 2.0 according to ISO 307, particularly preferably from 1.5 to 1.8, measured in m-cresol at 0.5% strength. The solution viscosity includes all values and subvalues therebetween, especially including 1.5, 1.6, 1.7, 1.8 and 1.9.

The second pulverulent component preferably comprises a polyamide or copolyamide which preferably comprises from 0.01 part to 5 parts by weight based on the total weight of the second pulverulent component, preferably from 0.1 part to 2 parts, of a diamine as regulator. The amount of diamine includes all values and subvalues therebetween, especially including 0.05, 0.1, 0.5, 1, 1.5, 2, 2.5, 3, 3.5, 4 and 4.5 parts by weight.

The second pulverulent component of the present invention particularly preferably comprises a polyamide or copolyamide in which the ratio of carboxy end group to amino end group is 1:2 or greater, preferably 1:3, more preferably 1:5. The content of carboxy end groups in this polyamide or copolyamide may be below 40 mmol/kg, preferably below 20 mmol/kg, and very preferably below 10 mmol/kg. The solution viscosity of the polyamide or copolyamide is preferably from 1.4 to 2.0 according to ISO 307, particularly preferably from 1.5 to 1.8, measured in m-cresol. The solution viscosity includes all values and subvalues therebetween, especially including 1.5, 1.6, 1.7, 1.8 and 1.9.

The powder may also comprise a mixture of oppositely difunctionally regulated and unregulated polyamide or copolyamide. The powder preferably comprises a mixture of oppositely difunctionally regulated and unregulated polyamide, the proportion of regulated polyamide or copolyamide in the mixture being from 0.1 to 99.9% by weight based on the weight of the mixture, preferably from 5 to 95%, and very particularly preferably from 10 to 90%, further preferred ranges being from 30 to 70%, from 40 to 60%, and from 20 to 80%. The proportion of regulated polyamide or copolyamide in the mixture includes all values and subvalues therebetween, especially including 5, 10, 15, 20, 25, 30, 35, 40, 45, 50, 55, 60, 65, 70, 75, 80, 85, 90 and 95% by weight. Because it is also possible for the powder to comprise a mixture of oppositely difunctionally regulated and unregulated powder, the user of the powders can, when necessary, utilize previous inventories of unregulated powder or unregulated recycling powder.

In principle, any of the polyamides having difunctional regulation can be used in the powder of the present invention. However, it can be advantageous for the powder to comprise a regulated nylon-12 or nylon-11. In particular, it can be advantageous for the powder to comprise precipitated nylon-12. The preparation of precipitated nylon-12 may be found in DE 29 06 647, for example. The sinter powder of the present invention particularly preferably comprises precipitated nylon-12 powder with round grain shape, e.g. that which can be prepared in accordance with DE 197 08 946 or DE 44 21 454. The powders of the present invention very particularly preferably comprise a regulated nylon-12 with a melting point of from 185 to 189° C., with an enthalpy of fusion of 112±17 kJ/mol and with a freezing point of from 138 to 143° C., the unregulated form of which is described in EP 0 911 142.

A copolyamide can likewise advantageously be used in one or both components of the powder of the present invention. Preference is given to a copolyamide comprising at least one of the units from the group of the lactams, of the diamine/dicarboxylic acid salts, and/or the aminocarboxylic acids. The powders very particularly preferably comprise monomer units from the group composed of laurolactam, caprolactam, and aminoundecanoic acid, or else comprise approximately equimolar amounts of the aliphatic dicarboxylic acids having from 6 to 22 carbon atoms, e.g. adipic acid, suberic acid, azelaic acid, sebacic acid, dodecanedioic acid, brassylic acid, tetradecanedioic acid, pentadecanedioic acid, octadecanedioic acid, or of the aliphatic diamines having from 10 to 16 carbon atoms, e.g. hexamethylenediamine, 2-methylpentamethylenediamine, 2,2,4- or 2,4,4-trimethylhexamethylenediamine, decamethylenediamine, dodecamethylenediamine. Alongside aliphatic dicarboxylic acids, use is made of aromatic dicarboxylic acids which generally contribute to higher glass transition temperatures, examples being terephthalic acid or isophthalic acid. Alongside aliphatic diamines, use is also made of aromatic diamines, examples being isophoronediamine, piperazine, bis(4-aminocyclohexyl)methane. The corresponding salts may also be used here.

Combinations composed of caprolactam, laurolactam, and AH salt are in particular known, as also are those composed of caprolactam, laurolactam, and DH salts, or caprolactam and laurolactam. These copolyamides in particular feature a low melting point.

Low-symmetry comonomers, in particular trimethylhexamethylenediamine (TMD, isomer mixture), isophoronediamine (IPD), bis(4-aminocyclohexyl)methane (PACM, isomer mixture), moreover reduce crystallinity—in the extreme case giving a completely amorphous copolyamide—leading to higher dimensional stability and, where appropriate, increased translucency of the moldings. Other suitable comonomers and rules for their selection are known to the person skilled in the art and are described by way of example in J. G. Dolden, Polymer (1976, 17), pp. 875-892.

The powder of the present invention comprising at least two components with oppositely difunctional regulation preferably comprises polyamide or copolyamide whose median particle size $d_{50}$ is from 10 to 250 µm, preferably from 30 to 100 µm, and very particularly preferably from 40 to 80 µm. The median particle size $d_{50}$ includes all values and subvalues therebetween, especially including 20, 40, 60, 80, 100, 120, 140, 160, 180, 200, 220 and 240 µm. The BET surface area is preferably below 15 $m^2/g$, with preference being smaller than 10 $m^2/g$, and with particular preference being smaller than 6 $m^2/g$. The grain size distribution may be narrow or broad, or else bimodal.

To improve processability, or for further modification of the powder, it may receive admixtures of inorganic foreign pigments, e.g. transition metal oxides, stabilizers, e.g. phenols, in particular sterically hindered phenols, powder-flow aids and other flow aids, e.g. fumed silicas, and also filler particles or other additives. Particular pigments which may be mentioned are carbon blacks and titanium dioxide. The amount of these substances added, based on the total weight of polymers in the powder, preferably complies with the concentration stated for fillers and additives for the powder.

After heat-aging of the powder comprising at least two components having oppositely difunctional regulation, there is preferably no shift in its recrystallization temperature (recrystallization peak in DSC cooling curve, measured according to ISO 11357 with cooling rate 20 K/min) and/or in its enthalpy of crystallization to values smaller than those for the virgin powder. Heat-aging here means exposure of the powder for from a few minutes to two or more days to a temperature in the range from the recrystallization temperature to a few degrees below the melting point. An example of typical artificial aging may take place at a temperature equal to the recrystallization temperature plus or minus approximately 5 K, for from 5 to 10 days, preferably for 7 days. The time of aging includes all values and subvalues therebetween, especially including 5.5, 6, 6.5, 7, 7.5, 8, 8.5, 9 and 9.5 days. Aging during use of the powder to form a structure typically takes place at a temperature which is below the melting point by from 1 to 15 K, preferably from 3 to 10 K, for from a few minutes to up to two days, depending on the time needed to form the particular component. In the heat-aging which takes place during the RP (Rapid Prototyping) and RM (Rapid Manufacturing) processes described above, powder which is not melted during the formation of the layers of the three-dimensional object is exposed to temperatures of only a few degrees below melting point during the construction procedure in the construction chamber. Preferred regulated powder of the present invention has, after heat-aging of the powder, a recrystallization temperature (a recrystallization peak) and/or an enthalpy of crystallization, which shift(s) to higher values. It is preferable that both the recrystallization temperature and the enthalpy of crystallization shift to higher values. A powder of the present invention which in the form of virgin powder has a recrystallization temperature above 138° C. very particularly preferably has, in the form of recycled powder obtained by aging for 7 days at 135° C., a recrystallization temperature higher, by from 0 to 3 K, preferably from 0.1 to 1 K, than the recrystallization temperature of the virgin powder.

The powder comprising at least two components having oppositely difunctional regulation may comprise at least one other filler or additive, alongside at least the oppositely difunctionally regulated polyamide components or oppositely difunctionally regulated copolyamide components. Examples of these fillers may be glass particles, metal particles, or ceramic particles or else flame retardants. The powder may in particular comprise glass beads, granular aluminum, steel shot, or granular metal as fillers.

The median particle size of the filler particles or additive particles here is preferably smaller than or approximately the same as that of the particles of the polyamides or copolyamides. The amount by which the median particle size $d_{50}$ of the fillers or additives exceeds the median particle size $d_{50}$ of the polyamides or copolyamides should preferably be not more than 20%, with preference not more than 15%, and very particularly preferably not more than 5%. A particular limit on the particle size arises from the permissible layer thickness in the particular RP or RM apparatus. Another sector of preference consists in particle sizes for the fillers or additives below 20 µm, preferably below 15 µm. The powder preferably comprises less than 75% by weight, preferably from 0.001 to 70% by weight, particularly preferably from 0.05 to 50% by weight, and very particularly preferably from 0.5 to 40% by weight, based on the total weight of the powder of these fillers or additives, based on the entirety of the polymers present. The amount of filler or additives includes all values and subvalues therebetween, especially including 0.005, 0.01, 0.05, 0.1, 0.5, 1, 5, 10, 15, 20, 25, 30, 35, 40, 45, 50, 55, 60, 65, and 70% by weight.

If the stated maximum levels for additives and/or fillers are exceeded the result, depending on the filler or additive used, can be marked impairment of the mechanical properties of moldings produced by means of these copolymer powders.

The powder of the present invention comprising at least two components having oppositely difunctional regulation is preferably produced by the process described below for producing a powder. In this process, a powder is prepared from two polyamides or copolyamides, and the polyamides or copolyamides here have oppositely difunctional regulation, meaning that the first component has an excess of carboxy end groups and the second component has an excess of amino end groups. Surprisingly, it has been found that if the starting material for preparing the virgin powder is polyamides or copolyamides having two oppositely difunctionally regulated components, the powder obtained is completely recyclable and has construction properties approximately the same as those of a virgin powder.

The first polyamide component or copolyamide component preferably comprises from 0.01 part to 5 parts by weight based on the weight of the first polyamide component, with preference from 0.1 to 2 parts, of a dicarboxylic acid as regulator. The amount of dicarboxylic acid includes all values and subvalues therebetween, especially including 0.05, 0.1, 0.5, 1, 1.5, 2, 2.5, 3, 3.5, 4 and 4.5 parts by weight. The ratio of carboxy end group to amino end group in the first component of the powder of the present invention is preferably 2:1 or higher, preferably from 5:1 to 500:1, and particularly preferably from 10:1 to 50:1. The ratio of carboxy end group to amino end group includes all values and subvalues therebetween, especially including 10:1, 20:1, 30:1, 40:1, 50:1, 100:1, 150:1, 200:1, 250:1, 300:1, 350:1, 400:1, and 450:1. It can be advantageous in the first component for the polyamide or copolyamide used to produce the powder of the present invention to have a content of amino end groups of less than 40 mmol/kg of polyamide, with preference less than 20 mmol/kg of polyamide, and very particularly preferably less than 10 mmol/kg of polyamide.

The second polyamide component or second copolyamide component preferably has from 0.01 part to 5 parts based on the weight of the second polyamide component, preferably from 0.1 part to 2 parts, of a diamine as regulator. The amount of regulator includes all values and subvalues therebetween, especially including 0.05, 0.1, 0.5, 1, 1.5, 2, 2.5, 3, 3.5, 4 and 4.5 parts by weight. Triamines are also used. The ratio of amino end group to carboxy end group in the second component of the powder is preferably 2:1 or greater, preferably from 5:1 to 500:1, and particularly preferably from 10:1 to 50:1. The ratio of amino end group to carboxy end group includes all values and subvalues therebetween, especially including 10:1, 20:1, 30:1, 40:1, 50:1, 100:1, 150:1, 200:1, 250:1, 300:1, 350:1, 400:1, and 450:1. It can be advantageous in the second component to use, for preparation of the powder, a polyamide or copolyamide whose content of carboxy end groups is smaller than 40 mmol/kg of polyamide or copolyamide, preferably smaller than 20 mmol/kg of polyamide or copolyamide, and very preferably smaller than 10 mmol/kg of polyamide or copolyamide.

The preparation of the regulated polyamides is described below. The main features of the preparation of the regulated polyamide powders have been previously disclosed in DE 44 21 454 and DE 197 08 946. In those specifications, these polyamides are described as pelletized starting materials for reprecipitation to give fluidized-bed sinter powders.

The preparation of copolyamides is described by way of example in DE 32 48 766, and is known to the person skilled in the art. The pellets arising during the preparation of thermoplastic random copolymers are then ground at low temperatures, for example at −30° C., in an impact mill or pinned-disk mill under nitrogen, in order to obtain pulverulent particles. At least one precautionary sieving should then be carried to remove the very coarse particles. It is then mostly advisable to fractionate the material. The grain size range of powders of the present invention is from 0 to 150 µm, preferably from 0 to 120 µm. The grain size includes all values and subvalues therebetween, especially including 10, 20, 30, 40, 50, 60, 70, 80, 90, 100, 110, 120, 130 and 140 µm.

The grain size distribution here remains relatively broad. Typical values for the $D_{90}/D_{10}$ ratio are from 1:2 to 1:15, preferably from 1:3 to 1:5. The $D_{90}/D_{10}$ ratio includes all values and subvalues therebetween, especially including 1:3, 1:4, 1:5, 1:6, 1:7, 1:8, 1:9, 1:10, 1:11, 1:12, 1:13 and 1:14. Mechanical post-treatment can also be advisable, for example in a high-speed mixer, in order to round the sharp-edged particles produced during milling and thus improve capability to apply relatively thin layers.

Examples of suitable regulators for the first polyamide component or first copolyamide component are linear, cyclic, or branched, organic dicarboxylic acids having from 2 to 30 carbon atoms. By way of non-limiting examples of dicarboxylic acids, mention may be made of succinic acid, glutaric acid, adipic acid, 2,2,4-trimethyladipic acid, suberic acid, azelaic acid, sebacic acid, dodecanedioic acid, brassylic acid, tetradecanedioic acid, pentadecanedioic acid, octadecanedioic acid, isophthalic acid, and terephthalic acid, and also mixtures of appropriate dicarboxylic acids. Particularly suitable dicarboxylic acids are those which have hydrocarbon chains whose length is from 6 to 30 carbon atoms. To permit problem-free use of the polyamides or copolyamides during the RP/RM processes described, it is preferable that no volatile dicarboxylic acids, in particular no dicarboxylic acids with a boiling point below 150° C., particularly preferably below 180° C., and very particularly preferably below 190° C., are used as regulators. The use of volatile carboxylic acids in the RP/RM processes described can in particular be disruptive if these remain in a form not chemically bonded within the powder, because they volatilize during the construction process and adversely affect the laser optics—in the case of laser sintering—by fuming, and in the worst case can damage the equipment.

The term dicarboxylic acid here is intended to encompass not only the free carboxylic acid functional group, but also any of the functional derivatives of the respective carboxylic acid, examples being acid halides, ester functions, amide functions, anhydrides, nitriles, or the corresponding carboxylate salts, each of which can be converted into the free carboxylic acid under polymerization/polycondensation conditions.

Examples of suitable regulators for the second polyamide component or second copolyamide component are linear, cyclic, and branched, organic diamines having from 2 to 30 carbon atoms. Non-limiting examples which may be mentioned for diamines are 1,3-diaminoethane, 1,3-diaminopropane, 1,4-diaminobutane, 1,6-diaminopentane, 1,6-diaminohexane, 1,12-diaminododecane, 1,6-diamino-2,2,4/2,4,4-trimethylhexane and 1,3-bis(aminoethyl)benzene, methylpentadiamine, 2-methylpentamethylenediamine, 2,2,4-trimethylhexamethylenediamine or 2,4,4-trimethylhexamethylenediamine, decamethylenediamine, dodecamethylenediamine, isophoronediamine, $C_{10}$ diamine, hexamethylenediamine, piperazine. PACM, TMD, and also mixtures of appropriate diamines. Aliphatic, cycloaliphatic, or araliphatic diamines having from 6 to 30 carbon atoms are particularly suitable. To permit problem-free use of the polyamides or copolyamides in the RP/RM processes described, it is preferable that the regulators used comprise no volatile diamines, in particular no diamines whose boiling point is below 150° C., particularly preferably below 180° C., and very particularly preferably below 190° C. The use of volatile diamines in the RP/RM processes described can in particular be disruptive if these remain in a form not chemically bonded within the powder, because they volatilize during the construction process and adversely affect the laser optics—in the case of laser sintering—by fuming, and in the worst case can damage the equipment.

The term diamines here is intended to encompass not only the free amine functional group but also any of the functional derivatives of the respective amine, examples being isocyanates each of which can be converted into the free amine under polymerization/polycondensation conditions.

The regulator is advantageously introduced into the polyamide or copolyamide before the polymerization is complete. This polymerization may start from the respective lactam, e.g. laurolactam, or from the appropriate ω-aminocarboxylic acid, e.g. ω-aminododecanoic acid, or from the appropriate units for the copolyamides. It can be advantageous to add a catalyst to the polyamide or copolyamide, an example being hypophosphorous acid.

However, for the purposes of the present invention it is also possible for the regulator to be reacted in the melt or in the solid phase, or in solution, with a high average molecular weight polyamide or copolyamide, as long as the amino end groups, in the case of preparation of the first component, or the carboxy end groups in the case of preparation of the second component, are reacted to the extent described above under the reaction conditions. A high average molecular weight polyamide or copolymamide is preferably one that has a solution viscosity of 1.4 to 2.0. In principle, if a polyamide is used another possible method is the reaction of the polyamide with the regulator during the preparation of the polyamide by the precipitation process described in DE 29 06 647. In this precipitation process, nylon-12 is dissolved in a solvent, preferably ethanol, and crystallized out from this solution under certain conditions. The regulator may be added during this process, e.g. into the solution of the nylon-12. It can also be advantageous to add a catalyst such as hypophosphorous acid to the polyamide or copolyamide at this point.

If use is made of a polyamide based on diamines and dicarboxylic acids, these being known as AABB polyamides, the synthesis takes place in a known manner, starting from solutions of the corresponding nylon salts, or from melts of the diamines and dicarboxylic acids, in approximately equimolar ratio. It can be advantageous here for the molten dicarboxylic acids to have been stabilized by addition of primary amines in accordance with DE 43 171 89 to inhibit discoloration.

According to the present invention, in the case of the AABB type, again, for the first component of the powder of the present invention, a polyamide is prepared with an excess of carboxy end groups, and comprises from 0.01 parts to 5 parts based on the weight of the first component of the powder, preferably from 0.1 to 2 parts, of a dicarboxylic acid as regulator. The amount of regulator includes all values and subvalues therebetween, especially including 0.05, 0.1, 0.5, 1, 1.5, 2, 2.5, 3, 3.5, 4 and 4.5 parts by weight. The ratio of carboxy end group to amino end group in the AABB-type regulated polyamide is preferably 2:1 or higher, preferably from 5:1 to 500:1, particularly preferably from 10:1 to 50:1. The ratio of carboxy end group to amino end group includes all values and subvalues therebetween, especially including 10:1, 20:1, 30:1, 40:1, 50:1, 100:1, 150:1, 200:1, 250:1, 300:1, 350:1, 400:1, and 450:1. In this case, it can again be advantageous for the AABB-type polyamide used to produce the first component of the powder of the present invention to have a content of amino end groups smaller than 40 mmol/kg of polyamide, preferably smaller than 20 mmol/kg of polyamide, and very preferably smaller than 10 mmol/kg of polyamide. For regulation, use may again be made of any of the abovementioned dicarboxylic acids, and in the case of the AABB polyamide here in the simplest case it is possible to use an excess of the dicarboxylic acid on which the polyamide is based.

For the second component of the powder, when AABB polyamides are used, a polyamide is prepared with an excess of amino end groups, and comprises from 0.01 part to 5 parts based on the weight of the second component of the powder, preferably from 0.1 to 2 parts, of a diamine as regulator. The amount of regulator includes all values and subvalues therebetween, especially including 0.05, 0.1, 0.5, 1, 1.5, 2, 2.5, 3, 3.5, 4 and 4.5 parts by weight. The ratio of amino end group to carboxy end group in the AABB-type amine-regulated polyamide is preferably 2:1 or greater, preferably from 5:1 to 500:1, and particularly preferably from 10:1 to 50:1. The ratio of amino end group to carboxy end group includes all values and subvalues therebetween, especially including 10:1, 20:1, 30:1, 40:1, 50:1, 100:1, 150:1, 200:1, 250:1, 300:1, 350:1, 400:1, and 450:1. In this case, it can again be advantageous for the AABB-type polyamide used to produce the second component of the powder to have a content of carboxy end groups smaller than 40 mmol/kg of polyamide, preferably smaller than 20 mmol/kg of polyamide, and very preferably smaller than 10 mmol/kg of polyamide. For regulation, use may again be made of any of the abovementioned amines, and for the AABB polyamide here in the simplest case it is possible to use an excess of the diamine on which the polyamide is based.

The regulated polyamide or copolyamide obtained for the first and the second component is pelletized and then either milled or—in the case of a homopolyamide—advantageously processed in accordance with DE 29 06 647, DE 19 708 946 or DE 4 421 454 (Hüls AG), to give a precipitated powder. The powder is obtained via dry-blend mixing of the two components, for example via addition of the two components to a high-speed mixer. It can be advantageous to add related-art powder-flow aid, such as fumed silicon dioxide, to both components and/or to the mixture. Typical amounts of powder-flow aid are from 0.01 to 10% by weight, based on the polyamide or copolyamide present in the composition. The amount of flow-powder aid includes all values and subvalues therebetween, especially including 0.05, 0.1, 0.5, 1, 2, 3, 4, 5, 6, 7, 8 and 9% by weight.

By virtue of the preparation method, the polyamide particles or copolyamide particles present in the powder are either acid-regulated or amine-regulated particles. The result is substantial suppression of the viscosity rise or post-condensation within the individual particles, even on exposure to long-lasting heat stress, such as that present in RP/RM plants. In contrast, in the molten regions which, after cooling, form the component, the two components can react with one another and generate the viscosity rise or post-condensation which is desired there because of the associated good mechanical properties of the components. The quantitative portions are preferably adjusted so that the total number of acid end groups in the powder is approximately the same as the total number of amino end groups. The ratio of acid end groups to amino end groups or of amino end groups to acid end groups in the powder mixture is less than 3:1, preferably less than 2:1, and particularly preferably 1.5:1, and very particularly preferably 1:1. The difference between the solution viscosities of the two starting components is if possible not more than 0.4, preferably not more than 0.2, and very particularly preferably not more than 0.1

The virgin powders used, based on polyamide or copolyamide and prepared by the process of the present invention for use in a process for production of moldings in a layer-by-layer process in which regions of the respective layer are selectively melted typically have a solution viscosity of $\eta_{rel.}$=from 1.4 to 2.0, preferably a solution viscosity of $\eta_{rel.}$=from 1.5 to 1.8, according to ISO 307, using 1%-phosphoric acid-doped m-cresol as solvent and 0.5% by weight of polyamide, based on the solvent. The solution viscosity includes all values and subvalues therebetween, especially including 1.55, 1.6, 1.65, 1.7, 1.75. If the powder of the present invention comprises at least one amine-regulated and one acid-regulated component, the solution viscosity and the amino and, respectively, acid end group content of the recycling powder are very little different from those of the virgin powder, and the recycling powder can therefore be reprocessed after precautionary sieving. However, the melted regions which form the component exhibit an increased solution viscosity and consequently good mechanical properties, in particular improved tensile strain at break, when comparison is made with a material composed merely of one regulated component.

To produce the powder, it can be advantageous to produce a mixture which comprises not only oppositely difunctionally regulated polyamide powder or oppositely difunctionally regulated copolyamide powder in the form of virgin powder but also regulated polyamide powder or regulated copolyamide powder in the form of recycling powder. It is also possible for the powder produced to be a mixture which comprises not only oppositely difunctionally regulated polyamide powder or oppositely difunctionally regulated copolyamide powder but also unregulated polyamide powder or unregulated copolyamide powder. It can also be advantageous for the powder produced to be a mixture which comprises not only oppositely difunctionally regulated polyamide or copolyamide but also various fillers, e.g. glass particles, ceramic particles, or metal particles, or other additives, such as flame retardants. Examples of typical fillers are granular metals, such as granular aluminum, or steel shot or glass beads.

The median particle size of the filler particles here is preferably smaller than or approximately the same as that of the particles of the polyamides or copolyamides. The amount by which the median particle size $d_{50}$ of the fillers exceeds the median particle size $d_{50}$ of the polyamides or copolyamides should preferably be not more than 20%, with preference not more than 15%, and very particularly preferably not more than 5%. A particular limit on the particle size arises from the permissible overall height or, respectively, layer thickness in an RP/RM apparatus suitable as for processes (RP/RM processes) described above. Typically, glass beads with a median diameter of from 20 to 80 μm are used. The median includes all values and subvalues therebetween, especially including 25, 30, 35, 40, 45, 50, 55, 60, 65, 70 and 75 μm. Another sector of preference consists in average particle sizes for the fillers or additives below 20 μm, preferably below 15 μm.

The powder of the present invention is preferably used in a process for producing moldings in a layer-by-layer process in which regions of the respective layer are selectively melted, and which uses a powder which comprises at least two oppositely difunctionally regulated polyamide components or at least two oppositely difunctionally regulated copolyamide components.

The powder used in this process preferably comprises a first component comprising an acid-regulated polyamide or copolyamide whose ratio of carboxy end groups to amino end groups is greater than 2:1, and which has an amino end group content smaller than 40 mmol/kg, and a relative solution viscosity of from 1.4 to 2.0 according to ISO 307, and also a second component comprising an amine-regulated polyamide or copolyamide whose ratio of amino end groups to carboxy end groups is greater than 2:1, and which has a carboxy end group content smaller than 40 mmol/kg, and a relative solution viscosity of from 1.4 to 2.0 according to ISO 307. In both cases the solution viscosity includes all values and subvalues therebetween, especially including 1.5, 1.6, 1.7, 1.8 and 1.9.

The powder may comprise nylon-11 and/or nylon-12.

It can be advantageous for this process to use a powder which comprises, as first component, a polyamide or copolyamide regulated by dicarboxylic acids or by derivatives thereof, and, as second component, a polyamide or copolyamide regulated by diamines or by derivatives thereof. The first component may comprise a polyamide or copolyamide regulated by one or more linear, cyclic, or branched organic dicarboxylic acids, or by derivatives thereof having from 2 to 30 carbon atoms. The second component may comprise a polyamide or copolyamide regulated by one or more linear, cyclic, or branched organic diamines, or by derivatives thereof having from 2 to 30 carbon atoms.

A powder preferably used in the process of the present invention for producing moldings in a layer-by-layer process in which regions of the respective layer are selectively melted comprises a polyamide powder or copolyamide powder whose relative solution viscosity according to ISO 307 is from 1.5 to 1.8. The solution viscosity includes all values and subvalues therebetween, especially including 1.55, 1.6, 1.65, 1.7, 1.75.

It has proven particularly advantageous for the process of the present invention to use a first component which comprises from 0.01 to 5% by weight, preferably from 0.1 to 2% by weight, based on the polyamide or copolyamide used, of the dicarboxylic acid used for regulation, and whose content of amino end groups is below 20 mmol/kg, preferably smaller than 10 mmol/kg of polyamide or copolyamide, and also a second component which comprises from 0.01 to 5% by weight, preferably from 0.1 to 2% by weight, based on the polyamide or copolyamide used, of the diamine used for regulation, and whose content of carboxy end groups is below 20 mmol/kg, preferably smaller than 10 mmol/kg of polyamide or copolyamide.

One method of carrying out the process uses a powder which comprises a mixture of oppositely difunctionally regulated and unregulated polyamide powder or of oppositely difunctionally regulated and unregulated copolyamide powder, the proportion of regulated powder in the mixture being from 0.1 to 99.9% by weight based on the weight of the mixture, preferably from 5 to 95%, particularly preferably from 25 to 75%.

The powder used in the process of the present invention and comprising oppositely difunctionally regulated polyamide or copolyamide may be virgin powder, recycling powder, or a mixture of virgin powder and recycling powder. It can be advantageous for the process to use powders comprising recycling powder, or comprising a mixture of recycling powder and virgin powder, the proportion of virgin powder in the mixture being smaller than 50% by weight based on the weight of the mixture, preferably smaller than 25%, and very particularly preferably smaller than 10%. It is particularly preferable to use powder which comprises at least 40% by weight of recycling powder.

The powder used may moreover comprise fillers, preferably inorganic fillers. Examples of these inorganic fillers used may be glass particles, ceramic particles, or glass beads.

The process of the present invention, and the use of the powder of the present invention, provide access to moldings produced by a process for production of moldings in a layer-by-layer process in which regions of the respective layer are selectively melted, and comprising oppositely difunctionally regulated polyamide or copolyamide. In particular, moldings which comprise an oppositely difunctionally regulated nylon-12 are accessible. It is also possible to obtain moldings which comprise a mixture of oppositely difunctionally regulated and unregulated polyamide or copolyamide, the proportion of regulated polyamide or copolyamide in the polyamide or copolyamide mixture being from 0.1 to 100% by weight based on the weight of the mixture. The proportion of regulated polyamide or copolyamide in the polyamide or copolyamide mixture includes all values and subvalues therebetween, especially including 0.5, 1, 5, 10, 15, 20, 25, 30, 35, 40, 45, 50, 55, 60, 65, 70, 75, 80, 85, 90 and 95% by weight.

The moldings of the present invention may in particular also be produced by using a powder of the present invention in the form of aged material (aging as described above), where neither the recrystallization peak of this material nor its enthalpy of crystallization is smaller than those of the unaged material. A molding of the present invention is preferably produced using an aged material the recrystallization peak and enthalpy of crystallization of which are higher than in those of the unaged material. Despite the use of recycled powder, the properties of the moldings are almost the same as those of moldings produced from virgin powder.

The powder according to the resent invention may also be molded using a process according to U.S. Pat. No. 6,136,948 and WO 96/06881 (both DTM Corporation), WO 01/38061, EP 1 015 214, DE 103 11 438, DE 102004012682.8, DE 102004012683.6, and DE 102004020452.7, DE 103 20 590.4, and DE 103 305 91.2, all of which are described above and all of which are incorporated by reference.

The production of moldings which comprise oppositely difunctionally regulated polyamide or copolyamide, in particular oppositely difunctionally regulated nylon-12, is substantially more environmentally compatible and cost-effective, because it is possible to use all of the recycling powder to produce moldings.

Application sectors for these moldings are found both in rapid prototyping and in rapid manufacturing. The latter always means small production runs, i.e. production of more than one identical part for which production by means of an injection mold is, however, uneconomic. Examples here are parts for high-specification cars of which only small numbers are produced, or replacement parts for motorsports, for which not only the small numbers but also the availability time plays a part. Another example of an application can be high-specification fashion items, such as spectacle frames. Production of similar but individual components manufactured in relatively large numbers is also included, examples being hearing aids. Possible examples of the industrial sectors which use the parts of the present invention are the aerospace industry, medical technology, mechanical engineering, automobile construction, the sports industry, the household goods industry, the electrical industry, and lifestyle products.

Having generally described this invention, a further understanding can be obtained by reference to certain specific examples which are provided herein for purposes of illustration only, and are not intended to be limiting unless otherwise specified.

EXAMPLES

In the Examples, unless otherwise specified, "%" refers to "% by weight" and "parts" refers to "parts by weight".

Example 1

Reprecipitation of Unregulated nylon-12 (PA 12), in Accordance with DE-A 19708946, not According to the Present Invention 40 kg of unregulated PA12 (eta rel−1.63, [COOH]=71 mmol/kg; [$NH_2$]=63 mmol/kg) were heated to 145° C. with 0.2 kg of IRGANOX 1089% (=N,N'-hexamethylenebis(3,5-di-tert-butyl-4-hydroxyhydrocinnamide), with 350 l of ethanol denatured with 2-butanone and 1% water content, within a period of 5 hours in a 0.8 m³ stirred vessel (D=90 cm, h=170 cm), and kept for 1 hour at this temperature, with stirring (blade stirrer, d=42 cm, rotation rate=120 rpm). The jacket temperature was then reduced to 120° C., and the internal temperature was brought to 125° C., using a cooling rate of 45 K/h at the same stirrer rotation rate. From this juncture onward, the jacket temperature was kept below the internal temperature by from 2 K to 3 K, using the same cooling rate. The internal temperature was brought to 117° C. using the same cooling rate and is then kept constant for 60 minutes. The internal temperature was then brought to 110° C., using a cooling rate of 40 K/h. The precipitation began at this temperature and was discernible from evolution of heat. After 20 minutes, the internal temperature fell with the end of precipitation. The suspension was cooled to 75° C. and was then transferred to a paddle dryer. The ethanol was removed from the suspension by distillation at 70° C./400 mbar, with stirrer running, and the residue was then further dried for 3 hours at 20 mbar/85° C.

| Sieve analysis: | <32 µm: 4% by weight |
| --- | --- |
| | <40 µm: 19% by weight |
| | <50 µm: 44% by weight |
| | <63 µm: 83% by weight |
| | <80 µm: 91% by weight |
| | <100 µm: 100% by weight |
| BET: | 6.1 m²/g |
| Bulk density: | 442 g/l. |

Example 2

Reprecipitation of dicarboxylic-acid-regulated PA 12 (component I)

The experiment of example 1 was repeated, using PA 12 pellets which had been obtained by hydrolytic LL polymerization in the presence of 1 part of dodecanedioc acid per 100 parts of laurolactam: $\eta_{rel.}$=1.61, [COOH]=122 mmol/kg, [NH$_2$]=5 mmol/kg. Except for the stirrer rotation rate (150 rpm), the conditions for solution, precipitation, and drying were those selected in example 1. The bulk density of the product was 425 g/l, and its BET was 6.6 m²/g.
Sieve analysis gave the following values:
<32 µm: 8% by weight
<40 µm: 27% by weight
<50 µm: 61% by weight
<63 µm: 97% by weight
<90 µm: 100% by weight Example 3

Reprecipitation of diamine-regulated PA 12 (component II)

The experiment of example 1 was repeated using PA 12 pellets which had been obtained via hydrolytic LL polymerization in the presence of 0.8 part of PACM-50 per 100 parts of laurolactam: $\eta_{rel.}$=1.76 [COOH]=24 mmol/kg, [NH$_2$]=81 mmol/kg. Except for the stirrer rotation rate (150 rpm), the conditions for solution, precipitation, and drying were those selected in example 1. The bulk density of the product was 405 g/l, and its BET was 7.1 m²/g.
Sieve analysis gave the following values:
<32 µm: 2% by weight
<40 µm: 17% by weight
<50 µm: 41% by weight
<63 µm: 50% by weight
<90 µm: 90% by weight
<100 µm: 100% by weight Example 4

According to the Present Invention

The acid-regulated polyamide powder of example 2 was mixed with the amine-regulated polyamide powder of example 3 in a ratio of 40:60. The mixture was prepared in 3 minutes at 400 rpm in an MTI M20 mixer. The $\eta_{rel.}$ of the mixture was 1.61.

Example 5

According to the Present Invention

The acid-regulated polyamide powder of example 2 and the amine-regulated polyamide powder of example 3 were treated with glass beads (40-80 µm) as filler in a ratio of 6:9:10, and mixed. For this, the two powder components and the glass beads were placed in the MTI mixer in one step and the mixture was likewise prepared at 400 rpm in a mixing time of 5 minutes.

Example 6

According to the Present Invention

For component I, a powder was produced from a random copolyamide obtained via hydrolytic polycondensation and composed of 60 parts of laurolactam, 25 parts of caprolactam, and 8.2 parts of adipic acid and 6.8 parts of hexamethylenediamine, by low-temperature milling and subsequent fractionation. The excess of adipic acid was selected so as to give the powder an excess of carboxy end groups. 170 meq/g of carboxy groups and 20 meq of amino end groups were determined by titration. The solution viscosity was 1.41.

For component II a powder was produced from a random copolyamide prepared via hydrolytic polycondensation and composed of 60 parts of laurolactam, 25 parts of caprolactam, and 7.4 parts of adipic acid and 7.7 parts of hexamethylenediamine, by low-temperature milling and subsequent fractionation. The excess of hexamethylenediamine was selected so as to give the powder an excess of amino end groups. 5 meq/g of carboxy groups and 165 meq of amino end groups were determined by titration. The solution viscosity was 1.43.

Components I and II were mixed in a Henschel mixer (1500 rpm, 2 min) in a ratio of 1:1; 0.1 part of Aerosil 200 were then added to the mixture, likewise in the Henschel mixer (500 rpm, 1 min). The solution viscosity was 1.43. The MFR value was determined as 20 g/10 min for 160° C./2.16 kg. The bulk density is 462 g/l. The grain size distribution was determined as follows: d10=18 µm, d50=75 µm, d90=112 µm. 88 meq/g of carboxy groups and 92 meq of amino end groups were determined by titration.

Example 7

The thermal effects during laser sintering or during one of the RP/RM processes described above were simulated via heat-conditioning experiments in a drying cabinet at 160° C. over a shortened period. The powders of examples 1 to 5 were used. For example 6, the temperature set in the drying cabinet was 110° C. Table 1 gives the post-condensation $\eta_{rel}$ values as a function of the duration of the heat-conditioning experiments:

TABLE 1

Heat-conditioning experiments at 160° C. in a drying cabinet (example 6)

| Example | $\eta_{rel}$ start point | $\eta_{rel}$ after 1 h | $\eta_{rel}$ after 4 h | $\eta_{rel}$ after 8 h |
|---|---|---|---|---|
| 1 (unregulated PA12) | 1.60 | 1.82 | 2.30 | 2.30 |
| 2 (acid-regulated PA12) | 1.55 | 1.55 | 1.58 | 1.62 |
| 3 (amine-regulated PA12) | 1.66 | 1.72 | gelled | Gelled |
| PA12 mixture, 40:60 | 1.63 | 1.68 | gelled | Gelled |
| Copolyamide mixture 50:50 | 1.43 | 1.44 | 1.44 | 1.44 |

The examples very clearly show that the components I and II of the present invention of examples 2 and 3, both of which comprise regulated polyamide or copolyamide, exhibit a markedly lower rise in solution viscosity. Post-condensation of the polyamide or copolyamide is substantially suppressed within any individual powder grain.

The powders 4, 5, and 6 according to the present invention exhibit a solution viscosity smaller than 2 even after an experimental time of 8 hours, and would therefore be capable of reuse as recycling powder for laser sintering.

Example 8

Example 8 below shows the change in solution viscosity of regulated and unregulated nylon-12 powder as a function of construction time during laser sintering. Example 9 shows the change in solution viscosity for a powder of the present invention of example 4.

TABLE 2

Solution viscosities

| Example | $\eta_{rel}$ start point (powder) | $\eta_{rel}$ on component | $\eta_{rel}$ after 8 h of post-condensation on powder (example 7) |
|---|---|---|---|
| 1 (unregulated PA12) | 1.60 | 2.1 | 2.3 |
| 2 (acid-regulated PA12) | 1.55 | 1.55 | 1.62 |
| 3 (amine-regulated PA12) | 1.66 | gelled | gelled |
| PA12 mixture, 40:60 | 1.61 | 1.9 | gelled |
| Copolyamide mixture 50:50 | 1.43 | 1.59 | 1.44 |

It is clear that—to the extent that this is measurable—post-condensation could take place on the component, but not in the powder not consumed in the construction process. This is therefore available for the next construction process, with no loss of properties.

Example 9

Heat-Conditioning Experiment

A powder was produced as in examples 1, 3, 4 and 6, and heat-conditioned for 6 days at 150° C. in a Heräus VT 5102 vacuum-drying cabinet, in order to simulate the thermal stress arising in the RP/RM machine. The resultant artificially aged powder was then mixed (refreshed) with 40, 25, and 10 parts of untreated power, and consumed in the construction process in a laser sintering plant (EOSINT P 360, EOS GmbH, Krailling, Germany). The following results were achieved here:

TABLE 3

Results of heat-conditioning experiment

| Use of powder of example . . . | Density of components [g/l] | Modulus of elasticity [N/mm²] | Tensile strain at break [%] | Visual assessment |
|---|---|---|---|---|
| 1 refreshed with 40 parts | 0.93 | 1590 | 20 | surface rough, marked depressions |
| 1 refreshed with 250 parts | 0.9 | 1108 | 14.1 | surface very rough, deep depressions |
| 1 refreshed with 10 parts | 0.8 | 990 | 8.4 | surface very rough, deep depressions |
| 3 refreshed with 40 parts | 0.98 | 1801 | 21.1 | parts are yellowish, rough, and arched |
| 3 refreshed with 25 parts | 0.97 | 1780 | 21.5 | parts are yellowish, rough, and arched |
| 3 refreshed with 10 parts | 0.95 | 1407 | 16.1 | parts are yellowish, rough, and arched |
| 4 refreshed with 40 parts | 0.93 | 1601 | 18.6 | surface OK |
| 4 refreshed with 25 parts | 0.92 | 1644 | 17.9 | surface OK |
| 4 refreshed with 10 parts | 0.85 | 1375 | 15.11 | surface acceptable, but some roughness depending on processing parameters, light depressions |
| 6 refreshed with 40 parts | | 800 | 20.2 | surface acceptable |
| 6 refreshed with 25 parts | | 756 | 18.0 | surface acceptable |
| 6 refreshed with 10 parts | | 630 | 16.9 | surface acceptable, rougher than with more virgin powder |

The advantage of the powders of the present invention is clearly seen: the surface quality of the components produced therewith is markedly higher than that of those constructed using comparative powders. The same applies to mechanical properties. The difference becomes greater as the amount of heat-conditioning powder used increases. The powders of the present invention have particularly good suitability at the refreshment rates of from 10 to 25% desired in the market, but refreshment rates of 5% also lead to acceptable results.

Example 10

Recirculation Experiment

Powder of example 4 was consumed in the construction process in a laser sintering plant (EOSINT P 380, EOS GmbH, Krailling, Germany), and specifically in 9 passes, the reused powder in each case being refreshed with 10 parts of virgin powder, except in the first pass, which was begun with 100 parts of virgin powder. Each pass constructed about 2000 layers, each of depth 0.15 mm. In each case, the appropriate processing temperature was used; it was higher when using powder from the preceding pass, even with blending of virgin powder, than when using exclusively virgin powder. The components were constructed using different processing parameters. The parts using rapid irradiation but high laser power tend to have better appearance than parts produced using slow speed but lower laser power. This applies particularly from the eighth pass onward. Details concerning the processing parameters can be found in the recommendations of the machine producers.

The following results were achieved here:

TABLE 4

Recirculation experiment

| Powder of example 4 | Density of components [g/l] | Modulus of elasticity [N/mm²] | Tensile strain at break [%] | Visual assessment | Solution viscosity on powder |
|---|---|---|---|---|---|
| 1st pass | 0.9 | 1690 | 14.2 | Very good surface | 1.61 |
| 2nd pass | 0.92 | 1657 | 18.9 | Very good surface | Gelled |
| 3rd pass | 0.94 | 1821 | 41.2 | Very good surface | Gelled |
| 4th pass | 0.92 | 1808 | 16.49 | Very good surface | Gelled |
| 5th pass | 0.91 | 1745 | 24.6 | Very good surface | |
| 6th pass | 0.91 | 1624 | 21.4 | Very good surface | |
| 7th pass | 0.91 | 1661 | 18.5 | Very good surface | |
| 8th pass | 0.91 | 1638 | 38.9 | Very good surface, depending on processing parameters | |
| 9th pass | 0.89 | 1624 | 15.7 | Very good surface | Gelled |

Even after 9 passes, it was possible to construct parts with good mechanical properties and with good surfaces. Despite gelling, further use can be made of the powder of the present invention mixture without loss of the good mechanical properties of the components.

Example 11

Aging Experiments

For artificial heat-aging, the powder from example 1 and example 4 was aged artificially in a vacuum drying cabinet at 135° C. for 7 days.

DSC studies to DIN 53765 were carried out both on powder produced according to the present invention and on the artificially aged specimens, using Perkin Elmer DSC 7 equipment. The results of these studies are given in table 5.

TABLE 5

Results of aging experiments

| | Melting peak ° C. | Enthalpy of fusion J/g | Recrystallization peak ° C. | Enthalpy of recrystallization J/g |
|---|---|---|---|---|
| Powder from example 4, virgin | 186.3 | 113 | 138.4 | 61.8 |
| Powder from example 4 after heat-aging | 186.5 | 112.6 | 139.5 | 62.72 |
| Powder from example 1, virgin | 188.4 | 124.2 | 138.4 | 64.9 |
| Powder from example 1 after heat-aging | 192.2 | 124.9 | 133.1 | 59.0 |

As is clear from the results in table 5, the powder of the present invention as in example 4 has, after the aging process, a recrystallization temperature (recrystallization peak) which is even higher than the recrystallization temperature of the virgin material. In contrast, the known unregulated comparative powder of example 1 shows a marked fall-off in recrystallization temperature after the aging process.

German patent application 10 2004 047 876.7 filed Oct. 1, 2004, is incorporated herein by reference.

Numerous modifications and variations on the present invention are possible in light of the above teachings. It is therefore to be understood that within the scope of the appended claims, the invention may be practiced otherwise than as specifically described herein.

The invention claimed is:

1. A powder, comprising:
   a mixture of diacid-regulated polyamide and diamine-regulated polyamide and/or diacid-regulated copolyamide and diamine-regulated copolyamide;
   said powder being used in a layer-by-layer process in which regions of the respective pulverulent layer are selectively melted and, after cooling, are fixed.

2. The powder as claimed in claim 1, wherein the median grain diameter of particles in said mixture is from 30 to 100 μm.

3. The powder as claimed in claim 2, wherein the median grain diameter of particles in said mixture is from 40 to 80 μm.

4. The powder as claimed in claim 1, wherein the mixture has a ratio of carboxy end group to amino end group, or of amino end group to carboxy end group, which is smaller than 5:1.

5. The powder as claimed in claim 4, wherein the mixture has a ratio of carboxy end group to amino end group, or of amino end group to carboxy end group, which is smaller than 3:1.

6. The powder as claimed in claim 5, wherein the mixture has a ratio of carboxy end group to amino end group, or of amino end group to carboxy end group, which is smaller than 1.5:1.

7. The powder as claimed in claim 6, wherein the mixture has a ratio of carboxy end group to amino end group, or of amino end group to carboxy end group, which is smaller than 1.2:1.

8. The powder as claimed in claim 1, whose BET surface area is smaller than 15 m²/g.

9. The powder as claimed in claim 8, whose BET surface area is smaller than 10 m²/g.

10. The powder as claimed in claim 1, which comprises a regulated nylon-12.

11. The powder as claimed in claim 1, which comprises a regulated nylon-11.

12. The powder as claimed in claim 1, which comprises a regulated copolyamide.

13. The powder as claimed in claim 1, which comprises a mixture comprising diacid-regulated polyamide and diamine-regulated polyamide and unregulated polyamide or unregulated copolyamide.

14. The powder as claimed in claim 13, which comprises a mixture comprising diacid-regulated polyamide and diamine-regulated polyamide and unregulated polyamide or unregulated copolyamide, the proportion of regulated polyamide or regulated copolyamide in the mixture being from 0.1 to 99.9%.

15. The powder as claimed in claim 1, which comprises at least one other filler or additive.

16. The powder as claimed in claim 15, which comprises glass particles as filler.

17. The powder as claimed in claim 15, which comprises granular aluminum as filler.

18. The powder as claimed in claim 15, which comprises flame retardant as additive.

19. The powder as claimed in claim 1, which comprises at least one powder-flow aid.

20. The powder as claimed in claim 1, which comprises from 5 to 100% of recycling powder,
wherein said recycling powder is an unmelted powder from a previous RP/RM process.

21. The process as claimed in claim 1, wherein after heat-aging of the powder, the recrystallization peak and/or the enthalpy of crystallization of the powder does not shift to smaller values.

22. The powder as claimed in claim 1, wherein after heat-aging of the powder, the recrystallization peak and/or the enthalpy of crystallization shifts to higher values.

23. A layer-by-layer process, comprising:
selectively melting regions of at least one pulverulent layer comprising a powder comprising a mixture of diacid-regulated polyamide and diamine-regulated polyamide and/or diacid-regulated copolyamide and diamine-regulated copolyamide, and,
after cooling, fixing of said at least one layer.

24. The process as claimed in claim 23, wherein a median grain diameter of the mixture is from 30 to 100 µm.

25. The process as claimed in claim 24, wherein a median grain diameter of the mixture is from 40 to 80 µm.

26. The process as claimed in claim 23, wherein the mixture has a ratio of carboxy end group to amino end group, or of amino end group to carboxy end group, which is smaller than 5:1.

27. The process as claimed in claim 26, wherein the mixture has a ratio of carboxy end group to amino end group, or of amino end group to carboxy end group, which is smaller than 3:1.

28. The process as claimed in claim 27, wherein the mixture has a ratio of carboxy end group to amino end group, or of amino end group to carboxy end group, which is smaller than 1.5:1.

29. The process as claimed in claim 28, wherein the mixture has a ratio of carboxy end group to amino end group, or of amino end group to carboxy end group, which is smaller than 1.2:1.

30. The process as claimed in claim 23, wherein the BET surface area of the powder is smaller than 15 $m^2/g$.

31. The process as claimed in claim 30, wherein the BET surface area of the powder is smaller than 10 $m^2/g$.

32. The process as claimed in claim 23, wherein the powder comprises a regulated nylon-12.

33. The process as claimed in claim 23, wherein the powder comprises a regulated nylon-11.

34. The process as claimed in claim 23, wherein the powder comprises a regulated copolyamide.

35. The process as claimed in claim 23, wherein the powder comprises a mixture comprising diacid-regulated polyamide and diamine-regulated polyamide and unregulated polyamide or unregulated copolyamide.

36. The process as claimed in claim 35, wherein the powder comprises a mixture comprising diacid-regulated polyamide and diamine-regulated polyamide and unregulated polyamide or unregulated copolyamide, the proportion of regulated polyamide or copolyamide in the mixture being from 0.1 to 99.9%.

37. The process as claimed in claim 23, wherein the powder comprises at least one other filler or additive.

38. The process as claimed in claim 37, wherein the powder comprises glass particles as filler.

39. The process as claimed in claim 37, wherein the powder comprises granular aluminum as filler.

40. The process as claimed in claim 37, wherein the powder comprises flame retardant as additive.

41. The process as claimed in claim 23, wherein the powder comprises at least one powder-flow aid.

42. The process as claimed in claim 23, wherein the powder comprises from 5 to 100% of recycling powder;
wherein said recycling powder is unmelted powder from a previous RP/RM process.

43. The process as claimed in claim 23, wherein after heat-aging of the powder, the recrystallization peak and/or the enthalpy of crystallization of the powder does not shift to smaller values.

44. The process as claimed in claim 23, wherein after heat-aging of the powder, the recrystallization peak and/or the enthalpy of crystallization of the powder shifts to greater values.

45. The process as claimed in claim 23, wherein the solution viscosity of the powder is from 1.4 to 2 according to ISO 307 at 0.5% strength in m-cresol.

46. The process as claimed in claim 23, wherein the solution viscosity of the powder is from 1.5 to 1.8 according to ISO 307 at 0.5% strength in m-cresol.

47. A molding produced by the process according to claim 23.

48. The molding as claimed in claim 47, which comprises a mixture of diacid-regulated nylon-12 and diamine-regulated nylon-12.

49. The molding as claimed in claim 47, which comprises a mixture comprising diacid- and diamine-regulated and of unregulated polyamide or copolyamide, wherein the proportion of regulated polyamide in the polyamide mixtures if from 0.1 to 100%.

50. The molding as claimed in claim 47, which is produced using aged material of which neither the recrystallization peak nor the enthalpy of crystallization is smaller than those of the unaged material.

51. The molding as claimed in claim 50, which is produced using aged material of which the recrystallization peak and the enthalpy of crystallization are higher than those of the unaged material.

52. A molding, comprising:
a powder comprising
a mixture of diacid-regulated polyamide and diamine-regulated polyamide and/or diacid-regulated copolyamide and diamine-regulated copolyamide;

said powder being used in a layer-by-layer process in which regions of the respective pulverulent layer are selectively melted and, after cooling, are fixed.

53. A process for the preparation of powder as claimed in claim 1, comprising:
mixing
(i) a diacid-regulated polyamide powder or a diacid-regulated copolyamide powder, obtained via treatment of an unregulated polyamide or copolyamide with a dicarboxylic acid as regulator, and
(ii) a diamine-regulated polyamide powder or diamine-regulated copolyamide powder, obtained via treatment of an unregulated polyamide or copolyamide with a diamine as regulator.

54. The process as claimed in claim 53, wherein the treatment takes place via reaction of the unregulated polyamide or of the copolyamide during the polymerization.

55. The process as claimed in claim 54, wherein the treatment of the unregulated polyamide or of the copolyamide takes place via reaction of a high average molecular weight polyamide or copolyamide with a regulator in the melt, in the solid phase, or in solution.

56. The powder as claimed in claim 1, whose solution viscosity according to ISO 307 is from 1.4 to 2.0.

57. The powder as claimed in claim 56, whose solution viscosity according to ISO 307 is from 1.5 to 1.8.

* * * * *